United States Patent

Wadsworth

[11] Patent Number: 5,568,699
[45] Date of Patent: Oct. 29, 1996

[54] FINGERED FABRIC INSECT SWATTER

[76] Inventor: LeGrande D. Wadsworth, Rte. #1, Box 168, St. Ignatius, Mont. 59865

[21] Appl. No.: 462,233

[22] Filed: Jun. 5, 1995

[51] Int. Cl.$^6$ .................................................... A01M 3/02
[52] U.S. Cl. .................................................... 43/137
[58] Field of Search .................................... 43/134, 137

[56] References Cited

U.S. PATENT DOCUMENTS

| | | | |
|---|---|---|---|
| 1,021,883 | 4/1912 | Parsons et al. | 43/137 |
| 1,272,295 | 7/1918 | Moore | 43/137 |
| 1,650,548 | 5/1927 | Sullivan | 43/137 |
| 2,157,106 | 5/1939 | Baker | 43/137 |
| 2,298,071 | 10/1942 | Smith | 43/137 |
| 3,673,730 | 7/1972 | Hegenberger | 43/137 |
| 3,905,146 | 9/1975 | Ralston | 43/137 |
| 4,593,489 | 6/1986 | Gott et al. | 43/137 |
| 4,617,754 | 10/1986 | Miley | 43/137 |
| 4,674,227 | 6/1987 | Maier | 43/137 |
| 4,907,367 | 3/1990 | Herman | 43/137 |

Primary Examiner—Joseph J. Hail, III
Assistant Examiner—Jay A. Stelacone
Attorney, Agent, or Firm—Keith S. Bergman

[57] ABSTRACT

An insect swatter to allow swatting of insects without extrusion of the contents of the body casement. The swatter provides an elongate, resiliently rigid handle having at one end a yoke that carries overfolded layers of a fabric swatting member. The handle is attached to the yoke by a mortise and tenon-type joint. The swatting member is formed by two layers of felted entangled fiber material that defines on its outer insect impacting surfaces a plurality of spaced protruding nubbins. The outer end portion of the swatting member is formed by fingers, with a finger of one layer overlapping a slit between fingers of the adjacent layer.

4 Claims, 1 Drawing Sheet

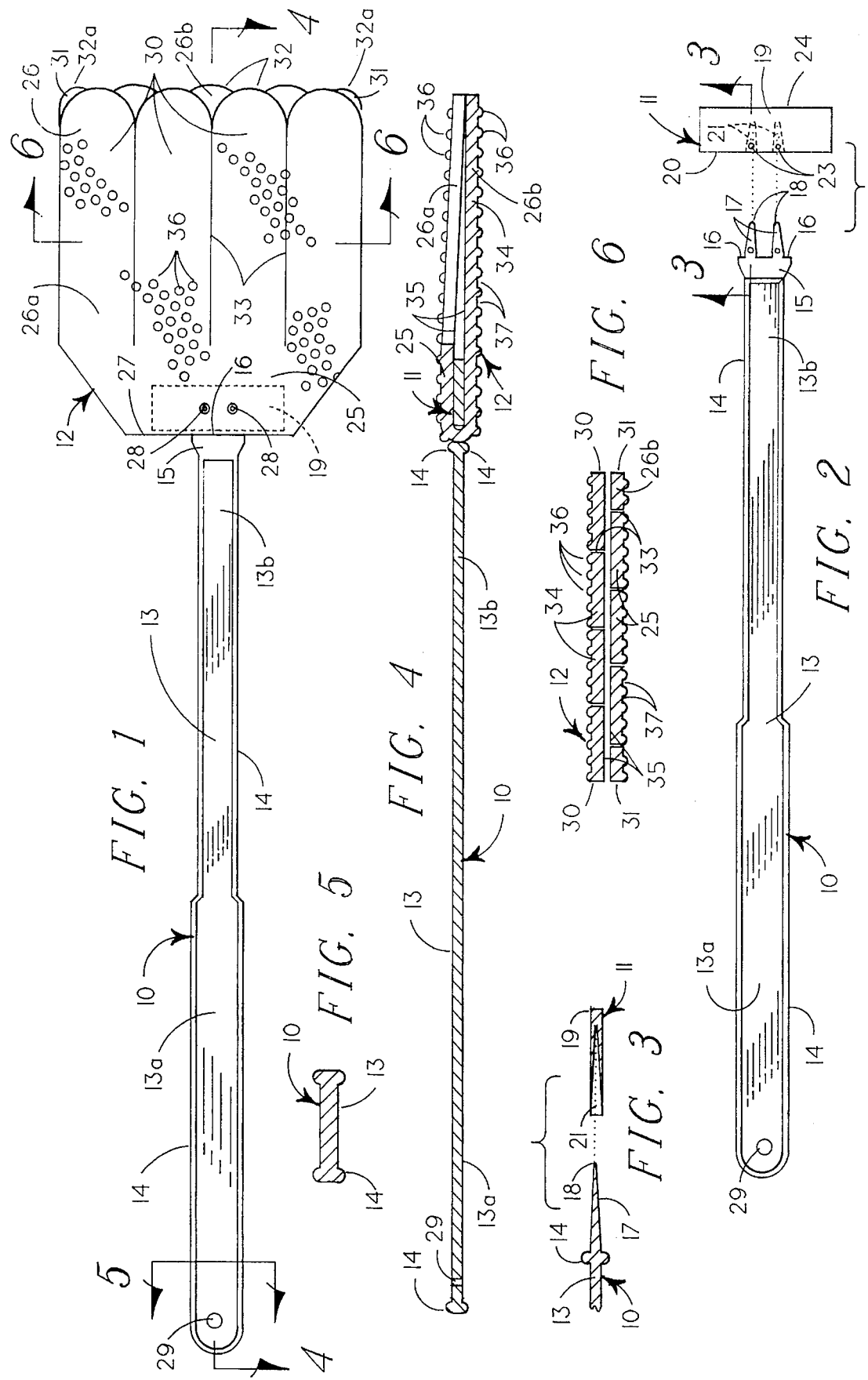

FINGERED FABRIC INSECT SWATTER

II. BACKGROUND OF INVENTION

IIA. RELATED APPLICATIONS

There are no applications related hereto heretofore filed in this or any foreign country.

IIB. FIELD OF INVENTION

This invention relates generally to insect swatters having a flexible swatting member and more particularly to such a swatter having a two-layer swatting member configured with fingers in its outer part and formed of fabric material defining plural spaced nubbins on its insect contacting surfaces.

IIC. BACKGROUND AND DESCRIPTION OF PRIOR ART

Probably as long as both have coexisted, and undoubtedly since the time of recorded history, insects and especially flies have been a bane of man's existence. Through history man has devised many and various methods of ridding himself and his environment of insects. These methods of eradication over the course of their development have become increasingly sophisticated and complex, but the simple swatting of insects by impacting with some object of a flexible or semi-flexible nature has remained a practical, efficient and still widely used eradication method.

The swatting of insects in its inception was concerned only with destruction of the insects, but as knowledge was gained concerning the process it was learned that commonly the process begot the extrusion of the contents of the body casement of the insect, both on a swatter and on a surface on which the insect was swatted. This often created unsightly and unsanitary accumulations of debris, on both swatting devices and the surfaces on which the insects were swatted. Responsively various insect swatters have heretofore become known to attempt to stun or kill an insect by swatting without rupturing the body casement or extruding contents thereof. The instant invention provides a new and novel member of this class of device that more efficiently and effectively accomplishes its purposes to distinguish it from known devices of the same type.

The swatting of insects with sufficient impact to kill or stun, while yet not rupturing its body casement or extruding its contents, is a relatively delicate process that has quite narrow limits for the swatting force applied and the method of its application. To accomplish this function, it has become known to use some type of a non-planar surface having protuberances and indentations so that an insect may be impacted partially or completely by an indented portion of an impacting device while the protruding portions maintain that indented portion at a spaced distance from an impacted surface.

Some swatter impacting device accomplishing this purpose have provided a thicker, peripheral rim about an indented medial portion and other similar devices have provided thickened medial portions in various patterned arrays with indented portions therebetween. Either type of impacting member is rather problematical in the accomplishment of its purposes, however, as an insect may be impacted with the protruding portions which may extrude its body contents. If the protruding portions are small and sufficiently spaced to lessen this probability, the indented portions may not sufficiently impact the insect to cause its ultimate destruction and the probability of impacting the insect with a protruding portion may increase.

Other swatting devices have provided impacting members that define a plurality of spaced orifices to create a member of a screen-like nature generally with orifices smaller than an insect's body profile. The operation of this type of impacting member is also problematic as if it be too rigid it will extrude an insect's body content but if it be too flexible it will not destroy the insect. The action of this type of species of impacting member will depend substantially upon the amount of impacting force with which it is applied, to make the operation quite variable and unreliable.

Another type of flexible impacting member having an irregular impacting surface has been created particularly from fabric and especially fabric such as one portion of hook and loop type fastening fabric. This type of surface may impact an insect with some cushioning effect and may entangle the insect sufficiently to maintain it on the impacting member, but still the operation of such material is erratic because the nature of the loops or hooks of the material tend to puncture and enhance the release of the contents of an insect body casement and the force of the applied impact also remains critical. In either event normally a part of an impacted insect remains entangled in the impacting member of the swatter to present an unsanitary condition and allow smearing on impacting surfaces to which the member is applied in the future, unless the insect debris is removed after each use.

The instant impacting member in contradistinction provides flexible fabric elements that have an outer insect contacting surface formed with spaced outwardly projecting nubbins that tend to maintain the indentations therebetween at a uniformly spaced distance from an impacting surface, but yet allow sufficient resilience at points of contact with an insect body to move to accommodate the insect body mass without extruding its contents. The preferred fabric which is commonly used for carpeting is formed by felting somewhat randomly oriented, entangled fibers to form both a fabric body and the nubbins. The nubbin dimensioning and configuration is determined so that only one nubbin or small portions of relatively few nubbins will contact an insect body casement to cause the action produced by the impacting element.

It has heretofore become known that impacting members of insect swatters may be effectively used over a wider range of impacting forces if those members are not of unitary structure, but rather are formed with a plurality of strip-like elements or fingers projecting outwardly from a body portion joined at the inner edge of the fingers. The finger elements of such impacting members have generally taken the form of a number of relatively narrow finger strips, usually arrayed in a single layer and in a side-by-side relationship. This type of finger often has not been efficient in delivering sufficient impacting force to destroy insects, and if its size, mass or stiffness be increased to bring its efficiency to a reasonable range, the finger elements generally have then impacted insects with such force as to extrude body casement contents. Impacting members that have used larger fingers that may tend to eliminate the low impact problem to some degree have provided fingers that, when of such stiffness as to destroy an insect, must impact the insect with such force and in such fashion as to extrude the insect body contents. The instant impacting member in contradistinction provides relatively fewer, larger fingers in two layered elements, with the fingers arranged so that the body portion of a finger of one layer extends over the slit portion between two fingers of the opposed layer. This construction, with the flexible nature and nubbin surface of the instant impacting elements, provides a more efficient impacting member that allows impact forces over a substantially greater range with a substantially greater degree of efficiency than prior devices.

The fingered structure of a swatting member also provides a secondary benefit in that it lessens force on the flexible impacting element while it moves through the air, to allow the use of less total force on the member to aid in serving its purposes. The fingered structure also allows the force to be applied to impact insects on irregular surfaces such as curvilinear surfaces, on window mill work having channels and ridges, around edges between two joining surfaces, and the like.

The double layered construction of the instant fingered impacting member also distinguishes it from prior known devices. It has heretofore become known to use at least two layers of material on a flexible impacting member of an insect swatter, but the second layer of material generally has not been coextensive with the entire impacting member and was used for stiffening purposes. The instant impacting member has two substantially coextensive adjacent elements, both of which are configured with fingers and formed of the same reasonably flexible material to provide a double impact upon striking a surface. The forward element will tend to strike before the rearward or outer element because the impact of the outer element will be delayed by air moving through the slots of the inner element to move the outer element away from the forward impacting element and cause the somewhat delayed secondary impact. This double impact tends to more efficiently destroy insects by allowing use of a greater total impacting force by distributing that force over two separate impacts that are spaced in time from each other to lessen the probability of rupturing of an insect body casement and extruding the contents as would be done by a single impact of the same total force.

The construction of the instant insect swatter is distinguished from the prior art in that it is of a compound nature with a releasable interconnection between the handle and swatting member. The swatting member carries in its inner portion proximate to the handle a yoke defining spaced mortises that fastenably receive cooperating tenons defined in the outer portion of the handle member to interconnect the yoke and handle members but allow their release if necessary. This construction provides a device that is simple and easy of manufacture and one that is most economic.

My invention lies not in any one of these features per se, but rather in the synergistic combination of all of the structures of my insect swatter that give rise to the functions necessarily flowing therefrom.

III. SUMMARY OF INVENTION

My invention provides an elongate handle attaching a flexible swatting member that impacts an insect on a surface to destroy the insect without rupturing its body casement or extruding the contents therefrom. The elongate, somewhat resilient handle member defines in one end portion two spaced tenons to releasably interconnect the swatting member. The swatting member is a two-layered structure formed of semi-flexible fabric folded upon itself. The swatting member carries adjacent its inner folded portion a resiliently deformable yoke that defines mortises to matingly receive and positionally maintain the tenons of the handle member to interconnect the two members. The flexible portion of the swatting member is of general rectilinear configuration with each adjacent element defining a plurality of fingers so arrayed that the fingers of one element overlap the slits between fingers of the opposed element. The swatting element is a fabric formed of entangled felted fibers defining on its external surfaces a plurality of spaced, protruding nubbins, with the nubbin size and indented spaces between nubbins related to the size of insects to be swatted.

In creating such an article, it is:

A principal object to provide an insect swatter having a flexible fabric swatting member defining two adjacent overlapping layers, each configured with elongate fingers arrayed so that the fingers of one layer overlap the slits between fingers of the opposed layer.

A further object is to provide such an insect swatter with semi-flexible, felted fabric swatting elements formed by randomly oriented, entangled fibers that define on the opposed outer surfaces plural spaced protuberances, with the spacing, protuberance size and extent of projection beyond indentations therebetween being regulated to the size of insects to be destroyed.

A still further object is to provide such an insect swatter that is effective through a wide range of variance of impacting forces to destroy an impacted insect, but yet prevent the rupturing of its body casement and extrusion of contents therefrom on either the impacting or impacted surfaces.

A still further object is to provide such an insect swatter that is of new and novel design, of rugged and durable nature, of simple and economic manufacture and one that is otherwise well adapted to the uses and purposes for which it is intended.

Other and further objects of my invention will appear from the following specification and accompanying drawings which form a part hereof. In carrying out the objects of my invention, however, it is to be remembered that its accidental features are susceptible of change in design and structural arrangement, with only one preferred and practical embodiment of the best known mode being specified and illustrated in the accompanying drawings as is required.

IV. BRIEF DESCRIPTION OF DRAWINGS

In the accompanying drawings which form a part hereof and wherein like numbers of reference refer to similar parts throughout:

FIG. 1 is an orthographic surface view of my insect swatter showing its various parts, their configuration and relationship.

FIG. 2 is an expanded orthographic surface view of the handle and yoke members showing the structure of their connecting elements.

FIG. 3 is a vertical cross-sectional view through the interconnecting elements of the handle and yoke members showing the details of the interconnection, taken on the line 3—3 on FIG. 2 in the direction indicated by the arrows thereon.

FIG. 4 is an elongate, vertical cross-sectional view through the insect swatter of FIG. 1, taken on the line 4—4 thereon in the direction indicated by the arrows.

FIG. 5 is a transverse, vertical cross-sectional view through the handle member of the swatter of FIG. 1, taken on the line 5—5 thereon in the direction indicated by the arrows.

FIG. 6 is a transverse, vertical cross-sectional view through the swatting member of the swatter of FIG. 1, taken on the line 6—6 thereon in the direction indicated by the arrows.

V. DESCRIPTION OF PREFERRED EMBODIMENT

My invention generally provides elongate handle 10 releasably interconnecting at one end yoke 11 which is fastenably carried within the inner end portion of flexible swatting member 12.

Handle 10 provides elongate semi-rigid handle body 13 defining rounded, somewhat enlarged peripheral rim 14 to provide additional strength and aid in preventing peripheral cracking. The outer or handle end portion 13a of body 13 is somewhat wider than the medial portion and defines hole 29 to accommodate a fastener to aid storage. The inner fastening end portion 13b of the handle body 13 defines somewhat wider transition element 15 interconnecting similar spaced fastening prongs 17 extending from inner edge 16. The fastening prongs 17 are tenons that extend outwardly from transition element 15 parallel to the handle body and taper somewhat, both laterally and in thickness, in their outward extension as illustrated in FIG. 2. Each fastening prong 17 in its outermost portion defines a rounded outer end 18 to aid insertion in an associated mortise.

Yoke 11 provides rectilinear planar body 19 of a thickness similar to that of handle body 13. Inner edge 20 of the yoke body 19 has a lateral extension greater than the distance between the inner portions of the opposed lateral edges of the fastening prongs 17 and not more than the lateral extension of the swatting member. Paired spaced fastening channels 21 configured and arrayed similarly to fastening prongs 17 are defined extending from inner edge 20 into the body of the fastening yoke to receive the fastening prongs in a fastenable fit.

Yoke body 19 defines similar swatting member fastening holes 23, inwardly of each side edge and through the medial portions of each fastening channel 21, to allow a fastener carried therein to fasten a fastening prong in the associated fastening channel. The overall width or extension of yoke body 19 is not greater than the width of a swatting member to be fastened thereon and its length, or extension between inner edge 20 and outer edge 24, preferably is less than about one-fourth of the length of a swatting member so that the yoke will not create undue stiffness in too great a portion of the swatting member.

Both handle and yoke members are formed of semi-rigid material having some resilience. The material of preference is one of the polymeric or resinous plastics that provides the additional benefits of allowing inexpensive manufacture by molding and providing an element having sufficient resilience that some of the impact force created in impacting an insect with the swatting member may be absorbed by the handle and yoke members. The absolute physical dimensions of these members is not critical so long as they relate to each other and to the swatting element as specified herein. Preferably the length of the handle will be approximately sixteen inches and the maximum width of the swatting member will be approximately four inches, with other configurational parameters being proportioned substantially as illustrated.

Flexible swatting member 12 provides two fabric elements, each having inner body portion 25 and outer finger portion 26 interconnected at their inner edge 27 preferably by being formed of a single piece of material folded upon itself. Holes (not shown) are defined through the inner edge to allow passage of fastening prongs 17. The inner body portions 25 are of such size as to carry the body 19 of yoke 11 therebetween and the yoke body 19 is fastened in that position by rivets 28 extending through holes (not shown) defined in the inner body portions 25 in alignment with fastening holes 23 defined in the yoke body. These rivets also fasten the fastening prongs 17 in fastening channels 21. If the yoke is somewhat smaller than inner body portions 25, the inner body portions of each swatting element may be sewn together about the periphery of the yoke by stitching (not shown) to further enhance the fastening of the yoke to the swatting element.

The outer portion 26 of each swatting element defines plural fingers 30, with finger portion 26a defining four substantially equally sized fingers and finger portion 26b defining three similarly sized medial finger portions and half finger portions 31 at each side to make each element of substantially the same peripheral configuration. Each finger 30 has a rounded outer end portion 32 and slit 33 extending from the rounded end portion inwardly to the forward edge of inner body portions 25 to define it from the adjacent finger. The rounded end portions 32a of the half fingers 31 are similar to the rounded end portions of other fingers except that they are somewhat more arcuate to allow the half fingers to have the same length as the full fingers 30.

As seen particularly in the cross-sectional view of FIG. 6, the material from which the swatting elements are formed provides body 34 having planar inner surfaces 35 and an irregular outer surface defining a plurality of spaced nubbins 36 with indentations 37 therebetween. The projection of the nubbins from the body of the swatting element material preferably is substantially equal to the average of the vertical dimension of the body of insects that are to be swatted, and preferably the areal size of indentations 37 is substantially equal to the average length of the body of an insect that is to be swatted, and at least not more than about twice that length. This dimensioning increases the probability that not more than one nubbin or small portions or not more than four nubbins will impact the body of an insect to be swatted and when that impact occurs, a substantial portion of the body of an insect will be within intercommunicating indentations 37 about the impacting nubbins to decrease the probability that the body casement of an impacted insect will be ruptured or its contents extruded upon either the swatting element or an impacted surface.

The material of preference from which my swatting elements are formed is manufactured for carpeting material and formed of entangled, randomly orientated, felted fibers, with a somewhat more consolidated flat inner surface 35 and somewhat more loosely formed nubbins 36. This material is commonly formed at least partially of thermoplastic fibers that may be shaped to their desired configurations in a heated environment against a molding surface, with sufficient interconnection and fiber configuration as to maintain that configuration during use of the fabric. Such materials also may be formed from felted fibers joined and configurationally maintained by adhesives, stiffeners and the like by methods known in the fabric forming arts and these materials are within the ambit and scope of my invention. The particular material of preference is one manufactured by All Felt Products, Inc. of Genoa, Ill. and merchandised by that entity under the name GBM Series.

The stiffness of the swatting elements is material to the operation of my swatter and the force with which an insect must be impacted with the swatting element dependent upon the stiffness of that element. The preferred material has appropriate stiffness characteristics for use without modification. If other material is used, however, its stiffness may be regulated by regulating the amount of interconnection between fibers and the amount of their permanent deformation. The stiffness also may be regulated by the use of known fabric stiffeners such as adhesives and plastic materials or by the use of layered backing material, as heretofore known in the fabric arts.

The dimensioning of the swatting elements is not critical, except as specified in relation to other swatter elements, but preferably for average use the width or lateral extension of the swatting element should be approximately four and one-half inches and its length or forward extension should be approximately six inches, with the other configurational parameters being apportioned substantially as in the drawings. This size of swatting element provides for efficient swatting without too great air resistance or the necessity of application of too great a total impacting force, while yet providing a large enough surface that the probability of impacting an insect from normal swatting distances is quite high, even for users of lower agility and coordination.

Having thusly described my invention, its function may be understood.

For use, a swatter formed according to the foregoing specification is grasped by the handle portion of the handle body distal from the swatting element by a user, normally with his hand of principal use. The swatter is then moved within swatting range of an insect to be impacted. Normally the insect will be supported on some object or structural element, though with sufficient dexterity it is possible to impact a flying insect in the sir if the user has appropriate ability. The swatter is then moved toward the subject insect with somewhat of an arcuate motion about the point of support on its handle and the swatting member is impacted upon the insect, preferably with the insect in a medial portion of the swatting member, to stun or kill the insect.

The amount of force required to effectively impact an insect to destroy it without rupturing its body casement and extruding the contents varies over a substantial range, and the force needs to be adjusted empirically for particular parameters of individual swatters and particular swatting techniques of a user to maintain these parameters within an efficiently operative range. This may easily be done by initial empirical experimentation by impacting relatively few insects. Thereafter with use the particular required parameters will become a matter of habitual familiarity.

In impacting insects, it is to be noted that as the first element of the swatting member proximal to the insect moves through the air and impacts upon a surface supporting an insect, air between the first swatting element and the impacting surface will be forced from between those elements and a part of that air will be forced through the slits between fingers of the impacting element. This air flow tends to move the fingers of the second distal impacting element somewhat away from the first element, especially by reason of the overlapping nature of the fingers construction. As that air flow dissipates, the momentum of the fingers of the rearward element come into impacting contact with the forward element to cause a secondary impact in the forward element a short time after the first element has impacted on an insect. This double impact tends to better stun or dispatch an insect and also distributes the total impacting force over a greater period of time than would a single impact, to tend to prevent rupturing of the insect's body casement and extrusion of contents. The function of a two-layered swatting element of the type specified has been found to be more efficient than a swatter with a single impacting element of the same type.

It is further to be noted that the nubbin structure of the impacting surface of the swatter elements causes only a portion of that surface to come into total impacting contact with an insect body. Normally with the nature of nubbins specified, not more than one-half of the area of an insect will be forcefully impacted by nubbin structure, and this impacted area will be distributed over a single nubbin or smaller areas of relatively few adjacent nubbins. This type of impacting force, over smaller partial areas of an insect body structure, tends to more efficiently dispatch and destroy the insect than would the same or greater force applied by a flat impacting element to significantly aid in dispatching the insect without rupturing its body casement or extruding the contents. This action is further enhanced by the construction of the nubbins which tend to have some natural resilience that causes some motion of the fibers from which they are formed to tend to conform the nubbins to an insect's body configuration upon impact and again lessen the probability of breaking of the body cavity and to prevent portions of the impacting surface to impale the body casement, as is the case with hook and loop type material.

The foregoing description of my invention is necessarily of a detailed nature so that a specific embodiment of it might be set forth as required, but it is to be understood that various modifications of detail, rearrangement and multiplication of parts might be resorted to without departing from its spirit, essence or scope.

Having thusly described my invention, what I desire to protect by Letters Patent and

What I claim is:

1. A swatter for insects, comprising in combination:

an elongate handle having fastening means at a first forward end to interconnect a fastening yoke with the handle;

a fastening yoke having first fastening means interconnected with the fastening means of the handle and second fastening means to interconnect a swatting member;

a swatting member interconnected to the yoke and extending spacedly therefrom in a forward direction distal from the handle, said swatting member having two substantially peripherally coincident overlapping flexible swatting elements interconnected to the yoke and extending in adjacency from the yoke in a direction distal from the handle, each said swatting element in its outer portion distal from the yoke defining plural spacedly adjacent fingers with slits therebetween, with the fingers of one said swatting said element overlying slits between the fingers of the adjacent swatting element.

2. The swatter for insects of claim 1 wherein each said swatting element has an outer surface distal from the other swatting element formed by a plurality of spaced nubbins and indentations.

3. The swatter for insects of claim 1 wherein the swatting elements are formed of an entangled fiber felt material.

4. In a swatter for insects having an elongate handle member with fastening means at a first forward end to connect a fastening yoke having first fastening means to interconnect with the fastening means of the handle member and second fastening means to interconnect a swatting member, the invention comprising, in combination:

a swatting member having two similar adjacent swatting elements interconnected to the yoke and extending spacedly therefrom in a direction distal from the handle member, each said swatting element having similar areal extent, being interconnected to the yoke to extend in adjacency from the yoke in a direction distal from the handle member, being formed of entangled felted fiber material with an outer surface distal from the other swatting element formed by a plurality of spaced nubbins with indentations therebetween, and defining plural, spacedly adjacent fingers with slits therebetween in an outer part of each said swatting member distal from the yoke and with the fingers of one said swatting element overlying slits between the fingers of the adjacent swatting element.

* * * * *